(12) United States Patent
Okahisa et al.

(10) Patent No.: US 6,696,198 B2
(45) Date of Patent: Feb. 24, 2004

(54) FLAT BATTERY

(75) Inventors: Mitsugu Okahisa, Ibaraki (JP); Susumu Yamanaka, Higashiosaka (JP); Takao Uyama, Hirakata (JP); Toshihiko Ikehata, Hirakata (JP); Tetsuya Takeuchi, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 244 days.

(21) Appl. No.: 09/875,217

(22) Filed: Jun. 6, 2001

(65) Prior Publication Data
US 2002/0031704 A1 Mar. 14, 2002

Related U.S. Application Data

(63) Continuation-in-part of application No. PCT/JP99/06893, filed on Dec. 8, 1999.

(30) Foreign Application Priority Data

Dec. 10, 1998 (JP) .......................... 10-351629
Jan. 26, 1999 (JP) .......................... 11-016767
Nov. 26, 1999 (JP) .......................... 11-335936

(51) Int. Cl.$^7$ ............................... H01M 6/12
(52) U.S. Cl. ............... 429/162; 429/163; 429/168; 429/170; 429/172; 429/178
(58) Field of Search ............... 429/162, 163, 429/168, 170, 172, 178

(56) References Cited

U.S. PATENT DOCUMENTS 4,659,636 A * 4/1987 Suzuki et al. ............ 429/54
5,486,431 A    1/1996 Tuttle et al.
5,707,756 A * 1/1998 Inoue et al. ............. 429/57

FOREIGN PATENT DOCUMENTS

| JP | 54-137731 U | 9/1979 |
| JP | 55-068269 U | 5/1980 |
| JP | 58-018364 A | 2/1981 |
| JP | 57-173266 U | 11/1982 |
| JP | 58-074764 U | 5/1983 |
| JP | 58-179750 U | 12/1983 |
| JP | 62-137557 U | 8/1987 |
| JP | 05-013059 A | 1/1993 |
| JP | 05-198292 A | 8/1993 |
| JP | 08-339785 A | 12/1996 |
| JP | 09-055227 A | 2/1997 |

* cited by examiner

Primary Examiner—Bruce F. Bell
(74) Attorney, Agent, or Firm—Akin Gump Strauss Hauer & Feld, L.L.P.

(57) ABSTRACT

The instant specification discloses a flat battery constituted by sealing a power generation element with: a case that works as one electrode terminal; a sealing plate that works as the other electrode terminal and has a flat central section projected outward and a flat peripheral section extending substantially parallel to the flat central section; and a gasket that insulates the case from the sealing plate, characterized in that the peripheral section of the sealing plate has an outer circumferential part being bent, or the case has a turned edge provided to make the peripheral section of the sealing plate fitted therein via the gasket and to partly press the gasket. The flat battery of the present invention having improvement in shape of the sealing plate and/or the case is sufficiently thin and exerts the effects of high leakage resistance and excellent mass productivity.

6 Claims, 5 Drawing Sheets

FIG. 3
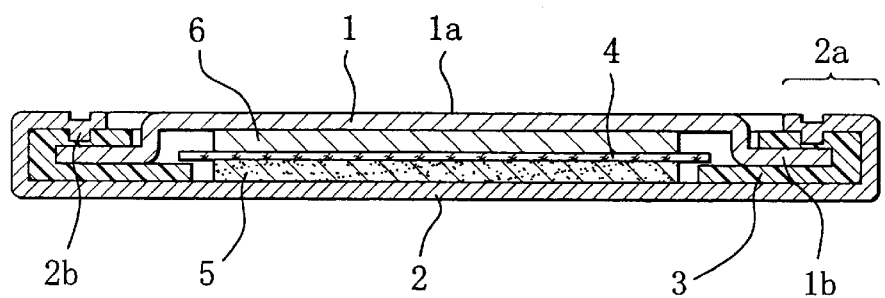
FIG. 4  FIG. 5  FIG. 6
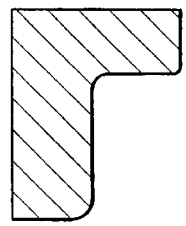 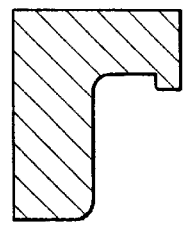 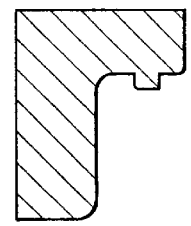

FLAT BATTERY

CROSS-REFERENCE TO RELATED APPLICATION

This application is a continuation-in-part of International Application No. PCT/JP99/06893 filed Dec. 8, 1999 the disclosure of which is incorporated herein by reference.

TECHNICAL FIELD

The present invention relates to a flat battery used for D.C. power sources of thin devices such as watches, pocket calculators, and memory cards, as well as for memory backup power sources. More specifically the present invention pertains to an ultra-thin battery of especially not greater than 1 mm in thickness, wherein a power generation element is sealed with a case, a sealing plate, and a gasket.

BACKGROUND ART

Organic electrolytic solution-containing flat batteries (hereinafter simply referred to as 'flat batteries'), where a power generation element obtained by combining an alkaline metal or the alloy thereof with an organic electrolytic solution is placed in a flat battery case (hereinafter simply referred to as 'case'), have high reliability and high potential for size and weight reduction, so that the use of the flat batteries have been increasing as main power sources of various electronic devices and memory backup power sources.

With an increase in demand for card-type thin electronic devices, thinner batteries are required as their main power sources and backup power sources. Typical applications of the card-type electronic devices include ID cards and pre-paid cards. Electronic settlement with the IC card will be common in near future, and the market of thin batteries will be expected to expand significantly.

Since the thickness of the typical credit cards is about 1 mm, it is accordingly required that the thickness of the batteries used for the thin devices is not greater than 1 mm.

The following problems, however, arise by simply reducing the thickness of the prior art flat battery to 1 mm or less in order to fulfill the requirement discussed above. In FIG. 13, a sectional view schematically illustrating the structure of a prior art coin type battery is shown. The prior art coin type battery having the thickness of greater than 1 mm as illustrated in FIG. 13 includes a power generation element that is sealed with a case 21 and a sealing plate 22 having a U-shaped curved periphery 22a via a gasket 23.

In the process of manufacturing the battery of approximately 1 mm in thickness, however, there is difficulty in press working to form the U-shaped curved periphery 22a. Even if press working is allowed, the size is not stabilized and the resulting battery has poor leakage resistance.

Then, as shown in FIG. 14, other flat batteries have been proposed (for example, the U.S. Pat. No. 5,486,431), where by using a sealing plate (hat-shaped sealing plate) 12 including a flat central section projected outward of a case and a flat peripheral section extending substantially parallel to the flat central section, a case 11 is fitted to the periphery of the sealing plate 12 in a case 11 via a gasket 13. FIG. 14 is a sectional view schematically illustrating the structure of this another prior art flat battery.

In the flat battery having the structure of FIG. 14, a power generation element, the gasket 13, and the sealing plate 12 are placed on the case 11 having a top-open circumferential wall, and the opening end of the circumferential wall is curved (bent) inward for sealing. This structure does not require formation of the U-shaped curved periphery 22a on the periphery of the sealing plate 22 as in the case of the coin type battery shown in FIG. 13 to allow press working and relatively facilitate manufacture of the battery.

The gasket 13 is simply in the state of being interposed between the case 11 and the upper face and the lower face of the flat periphery section of the sealing plate 12 and the drawbacks of this structure are accordingly that the force applied to the gasket 13 is insufficient and that the resulting battery has poor leakage resistance. This is because, in the coin type battery shown in FIG. 13, the curved periphery 22a of the sealing plate 22 partly presses the gasket 23 to enhance the leakage resistance when sealing but, in the flat battery shown in FIG. 14, it is difficult to form a curved portion on the sealing plate 12 to partly press the gasket 13.

Further, the case and the sealing plate should be thinned to reduce the thickness of the resulting battery. There is a problem that decreasing the thickness of the case, however, undesirably lowers the strength of the opening end of the case bent inward. This results in lowering the leakage resistance and durability of the battery.

In order to overcome the drawbacks discussed above, the object of the present invention is to improve the shape of the sealing plate and/or the case and thereby to provide a flat battery having excellent leakage resistance and durability and good mass productivity while being as thick as not greater than 1 mm.

DISCLOSURE OF THE INVENTION

For solving the above-mentioned problem in a flat battery constituted by sealing a power generation element with: a case that works as one electrode terminal; a sealing plate that works as the other electrode terminal and has a flat central section projected outward and a flat peripheral section extending substantially parallel to the flat central section; a gasket in the form of film that insulates the case from the sealing plate, the present invention is characterized in that an outer circumferential part of the peripheral section in the sealing plate is bent and/or that the case has a turned edge which fit the peripheral section of the sealing plate fitted via the gasket and said turned edged partly presses the gasket.

In the embodiment wherein the outer circumferential part of the peripheral section of the sealing plate is bent, it is preferable that the outer circumferential part is located in the case and the height of the outer circumferential part is not greater than 95% of thickness of the gasket.

It is also preferable that the bending angle of the outer circumferential part is in a range of 5 to 45 degrees relative to a direction parallel to a bottom face of the case (that is, relative to a horizontal plane).

In the embodiment wherein the case has the turned edge which fit the peripheral section of the sealing plate via the gasket and the turned edge partly presses the gasket, it is preferable that the turned edge has a circular recess partly pressing the gasket.

It is also preferable that the turned edge further has an outer circumferential end bent toward the gasket to partly press the gasket.

It is further preferable that the turned edge is inclined to the bottom face of the case to partly press the gasket. In this case, the angle of the inclination is preferably in a range of 5 to 20 degrees.

In the present invention, it is preferable that the gasket is composed of polyphenylene sulfide, and the partly pressed part of the gasket is pressed at a rate of 10 to 50% of original thickness of the gasket in the non-pressed state.

It is also preferable that the gasket is composed of polypropylene, and the partly pressed part of the gasket is pressed at a rate of 30 to 80% of original thickness of the gasket in the non-pressed state.

It is also preferable that the gasket is composed of polyethylene terephthalate, and the partly pressed part of the gasket is pressed at a rate of 10 to 70% of original thickness of the gasket in the non-pressed state.

It is also preferable that the gasket is composed of polyethylene naphthalate, and the partly pressed part of the gasket is pressed at a rate of 10 to 70% of original thickness of the gasket in the non-pressed state.

It is preferable that the flat battery of the present invention includes the sealing plate of not greater than 0.2 mm in thickness and has a thickness of not greater than 1.0 mm.

The present invention is also directed to a method of manufacturing a flat battery wherein a gasket of a substantially L-shaped cross section and a sealing plate that has a flat central section projected outward and a flat peripheral section extending substantially parallel to the flat central section are placed inside a top-open battery case, and a periphery of the case and the peripheral section of the sealing plate are fastened to each other via the gasket, the method comprising the steps of: curving an open end of the case inward to make the periphery of the case U-shaped and thereby form a turned edge; and recessing at least a portion of the turned edge or bending an outer circumferential part of the peripheral section toward the gasket, so as to form a part at which the sealing plate partly presses the gasket.

The present invention also provides a method of manufacturing a flat battery wherein a gasket of a substantially L-shaped cross section and a sealing plate that has a flat central section projected outward and a flat peripheral section extending substantially parallel to the flat central section are placed inside a top-open battery case, and a periphery of the case and the peripheral section of the sealing plate are fastened to each other via the gasket, the method comprising the steps of: curving an open end of the case inward to make the periphery of the case U-shaped and thereby form a turned edge that is substantially parallel to a bottom face of the case; and inclining the turned edge to the bottom face of the case, so as to partly press the gasket.

In this case, it is preferable that angle of the inclination of the turned edge is in a range of 5 to 20 degrees relative to a direction parallel to the bottom face of the case.

BRIEF DESCRIPTION OF THE DRAWINGS

FIG. 3 is a sectional view schematically illustrating the structure of a flat battery according to a second embodiment of the present invention.

FIG. 4 is a sectional view schematically illustrating the structure of a mold used for manufacturing the flat battery in the second embodiment of the present invention.

FIG. 5 is a sectional view schematically illustrating the structure of another mold used for manufacturing the flat battery in the second embodiment of the present invention.

FIG. 6 is a sectional view schematically illustrating the structure of still another mold used for manufacturing the flat battery in the second embodiment of the present invention.

BEST MODES FOR CARRYING OUT THE INVENTION

As described previously, in a flat battery constituted by sealing a power generation element with: a case that works as one electrode terminal; a sealing plate that works as the other electrode terminal and has a flat central section projected outward and a flat peripheral section extending substantially parallel to the flat central section; and a gasket that insulates the case from the sealing plate, the characteristic of the present invention is that an outer circumferential part of the peripheral section of the sealing plate is bent and/or that the case has a turned edge provided which fit the peripheral section of the sealing plate via the gasket and the turned edge partly presses the gasket.

The following describes one mode that the outer circumferential part of the peripheral section of the sealing plate is bent, as Embodiment 1 of the present invention, and another mode that the case has the turned edge provided which fit the peripheral section of the sealing plate via the gasket and the turned edge partly presses the gasket, as a second embodiment of the present invention. The flat battery of the present invention may have both the characteristics of Embodiment 1 and the second embodiment.

I. Embodiment 1

A flat battery according to Embodiment 1 of the present invention is discussed below with referring to FIG. 1.

The flat battery of the present invention has a power generation element that is sealed with a case 2 working as one electrode terminal, a sealing plate 1 working as the other electrode terminal, and a gasket 3 insulating the case 2 from the sealing plate 1.

Figure 2:
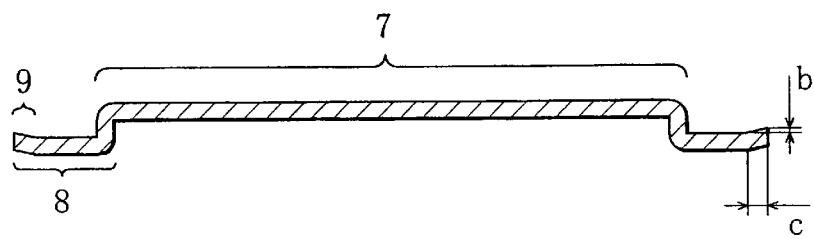
FIG. 2 is a sectional view schematically illustrating the structure of a sealing plate in Embodiment 1 of the present invention.

As clearly understood from the vertical sectional view shown in FIG. 2, the flat battery wherein the sealing plate 1 includes a convex section 7 having the primary face thereof protruded outward and a flat peripheral section 8 extending substantially parallel to the primary face, it is characterized that an outer circumferential part 9 of the flat peripheral section 8 is bent. Namely the main characteristic of this embodiment is the shape of the sealing plate 1.

By employing the above-mentioned structure of the sealing plate in the present invention, when the open end of the case 2 is curved inward and clamped, the outer circumferential part 9 of the sealing plate 1 bites the gasket 3 and the case 2 then presses the outer circumferential part 9 via the gasket 3, so that the force works to reduce the bending angle. In other words, the force applied to the outer circumferential part 9 of the sealing plate 1 works to return the outer circumferential part 9 to the original angle before bending.

Therefore, there can be obtained effects that the sealing properties between the sealing plate 1, the case 2, and the gasket 3 is enhanced and the leakage resistance and the durability of the resulting battery are also improved.

It is preferable that the outer circumferential part 9 is bent upward in a range of 5 to 45 degrees relative to the horizontal plane. The bending angle of less than 5 degrees does not enable the outer circumferential part 9 to sufficiently bite the gasket 3 in the process of curving of the case 2 and the force pressing the gasket 3 is weakened, and when the bending angle is greater than 45 degrees, on the other hand, there is a possibility that the outer circumferential part 9 pierces the gasket 2 to cause a short circuit in the process of curving of the case 2.

It is also preferable that the height of the bent outer circumferential part 9 is not greater than 95% of the thickness of the gasket 3. Otherwise there is a possibility that the outer circumferential part 9 pierces the gasket 2 to cause a short circuit in the process of curving and clamping the open end of the case 2.

In order to minimize the total thickness of the resulting battery, it is preferable that the thickness of the sealing plate 1 is not greater than 0.2 mm. The total thickness of the resulting flat battery is preferably not greater than 1.0 mm.

Then, the respective constituents of the flat battery of the present invention may be composed of any conventionally used materials. The flat battery may be manufactured according to any of the prior art methods.

As the material used for the case 2 working as one electrode terminal and the sealing plate 1 working as the other electrode terminal, there is a stainless steel or the like, for example. It is preferable that these are composed of an identical material and preferably composed of a stainless steel having excellent corrosion resistance.

As the material used for the gasket 3, which insulates the case 2 from the sealing plate 1, there are polyethylene, polypropylene, polyphenylene sulfide, polyethylene terephthalate and the like, for example. Especially preferable is polyphenylene sulfide, which has a sufficient breaking strength and is not damaged in the process of curving of the case 2.

A separator 4 may be composed of a non-woven fabric of polypropylene or cellulose or a film of porous polypropylene or polyethylene, and any of conventionally used materials may be used for a positive electrode and a negative electrode.

As the material of the positive electrode, for example, manganese dioxide, graphite fluoride, sulfinyl chloride, sulfur dioxide, or silver chromate can be employed.

The negative electrode, the positive electrode, and an electrolytic solution may be modified within the scope that does not damage the effects of the present invention. For example, a chargeable secondary battery may be obtained by applying metal lithium, a lithium alloy that allows absorption and desorption of lithium, carbon, a metal oxide, or polyacene for the negative electrode, an organic electrolytic solution for the electrolytic solution, and a material combined with lithium ion to form an intercalation compound (for example, a metal oxide such as divanadium pentaoxide, diniobium pentaoxide, or manganese dioxide, a composite oxide of lithium and a metal oxide, a sulfide such as titanium disulfide or molybdenum disulfide, and a conductive polymer such as polyaniline or polyacene) for the positive electrode.

The present invention also naturally provides a method of manufacturing the flat battery according to Embodiment 1. The manufacturing method is similar to the prior art method, except the step of previously forming an outer circumferential part of the sealing plate.

Embodiment 1 of the present invention is discussed in detail below with some examples, although the invention is not restricted to such examples in any sense.

EXAMPLES 1 TO 5

Figure 1:
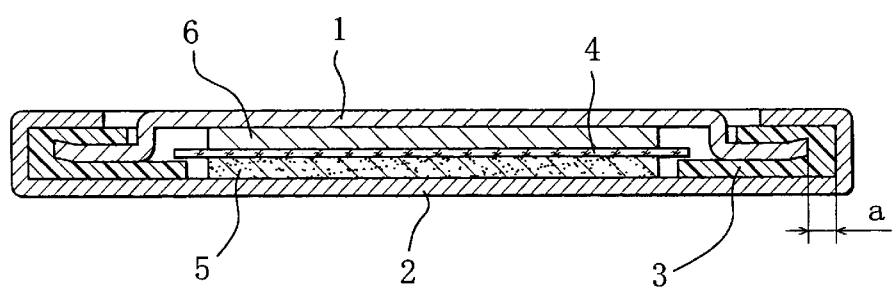
FIG. 1 is a sectional view schematically illustrating the structure of a flat battery according to Embodiment 1 of the present invention.

FIG. 1 is a vertical sectional view illustrating the structure of flat batteries (manganese dioxide/lithium batteries) of these Examples. In FIG. 1, 1 is a sealing plate composed of stainless steel and having a bent outer circumferential part around a flat peripheral section, 2 is a case also working as a positive electrode terminal. Also, 3 is ring gasket composed of polyphenylene sulfide and 4 is a separator composed of a polypropylene non-woven fabric and 5 is a positive electrode obtained by kneading a powder mixture of manganese dioxide, graphite and a binding agent (fluororesin) with water, granulating, then drying, and compression molding to a fixed dimension. And, 6 is a negative electrode including metal lithium as the active material thereof.

In first, the positive electrode 5, the separator 4, and the negative electrode 6 were placed in the case 2 and an organic electrolytic solution (obtained by dissolving lithium perchlorate at a concentration of 1 mol/liter in an equal-volume solvent mixture of propylene carbonate and 1,2-dimethoxyethane) was charged into the case 2. The opening of the case 2 was caulked via the gasket 3, which was an insulator against both the case 2 and the sealing plate 1 to give the flat batteries having the structure discussed above.

The thicknesses of the case and the sealing plate were set to 0.1 mm and the thickness of the gasket ('a' in FIG. 1) was set to 0.25 mm and flat-type manganese dioxide-lithium batteries having the diameter of 20.0 mm and the thickness of 1.0 mm were manufactured. The length of the peripheral section of the sealing plate 1 was set to 0.80 mm, and the length of the outer circumferential part ('c' in FIG. 2) was set to 0.40 mm. The bending height ('b' in FIG. 2) and the bending angle of the outer circumferential part are shown in Table 1.

Evaluation

Rate of leakage

A hundred batteries of each Example were manufactured and subjected to a thermal impact cycle test for evaluation of leakage, which repeated a cycle that kept the battery at a temperature of −10° C. for one hour and then at a temperature of 60° C. for one hour. The confirmation of leakage was carried out by the manner of taking batteries after 120 cycles and 240 cycles and visually observing the surface of each battery. The rate of occurrence of leakage was determined by an equation of:

(Number of batteries with leakage)/(Total number of batteries (100))×100(%).

Results are shown in Table 1.

Rate of occurrence of short circuit

After assembly of the batteries, the voltage of each battery was measured to confirm the occurrence of short circuit. The rate of occurrence of short circuit was determined by an equation of:

(Number of batteries short-circuiting)/(Total number of batteries (100))×100(%).

Results are shown in Table 1.

COMPARATIVE EXAMPLE 1

A flat battery having the prior art structure was produced for the purpose of comparison in the same manner as Example 1, except that the peripheral section of the sealing plate was not bent to form the outer circumferential part. This battery was evaluated in the same manner as Example 1. Results of evaluation are shown in Table 1.

TABLE 1

|  | Bending Height (mm) | Bending Angle (°) | (Gasket thickness/ Bending height) × 100 (%) | Rate of leakage (%) 120 cycle | Rate of leakage (%) 240 cycle | Rate of occurrence of short circuit (%) |
|---|---|---|---|---|---|---|
| Ex. | | | | | | |
| 1 | 0.34 | 40 | 136 | 0 | 0 | 9 |
| 2 | 0.23 | 30 | 92 | 0 | 0 | 0 |
| 3 | 0.15 | 20 | 60 | 0 | 0 | 0 |
| 4 | 0.07 | 10 | 28 | 0 | 0 | 0 |
| 5 | 0.03 | 5 | 12 | 3 | 0 | 0 |
| Com. Ex. 1 | 0 | 0 | 0 | 15 | 0 | 0 |

EXAMPLES 6 TO 11

Flat batteries in accordance with the present invention were produced in the same manner as Example 1, except that the length of the outer circumferential part of the sealing plate was set to 0.20 mm and that the bending height and the bending angle were set as shown in Table 2. these batteries were evaluated in the same manner as Example 1. Results of evaluation are shown in Table 2.

TABLE 2

|  | Bending Height (mm) | Bending Angle (°) | (Gasket thickness/ Bending height) × 100 (%) | Rate of leakage (%) 120 cycle | Rate of leakage (%) 240 cycle | Rate of occurrence of short circuit (%) |
|---|---|---|---|---|---|---|
| Ex. | | | | | | |
| 6 | 0.24 | 50 | 96 | 0 | 0 | 1 |
| 7 | 0.17 | 40 | 68 | 0 | 0 | 0 |
| 8 | 0.12 | 30 | 48 | 0 | 3 | 0 |
| 9 | 0.07 | 20 | 28 | 0 | 7 | 0 |
| 10 | 0.04 | 10 | 16 | 0 | 17 | 0 |
| 11 | 0.02 | 5 | 8 | 5 | 44 | 0 |

EXAMPLES 12 TO 15

Flat batteries in accordance with the present invention were produced in the same manner as Example 1, except that the thickness of the resulting battery was set to 0.5 mm, that the thickness of the gasket was set to 0.10 mm, and that the bending height and the bending angle were set as shown in Table 3. These batteries were evaluated in the same manner as Example 1. Results of evaluation are shown in Table 3.

COMPARATIVE EXAMPLE 2

A flat battery having the prior art structure was produced for the purpose of comparison in the same manner as example 12, except that the peripheral section of the sealing plate was not bent to form the outer circumferential part. This battery was evaluated in the same manner as Example 1. Results of evaluation are shown in table 3.

TABLE 3

|  | Bending Height (mm) | Bending Angle (°) | (Gasket thickness/ Bending height) × 100 (%) | Rate of leakage (%) 120 cycle | Rate of leakage (%) 240 cycle | Rate of occurrence of short circuit (%) |
|---|---|---|---|---|---|---|
| Ex. | | | | | | |
| 12 | 0.15 | 30 | 150 | 0 | 0 | 13 |
| 13 | 0.11 | 15 | 110 | 0 | 0 | 2 |
| 14 | 0.07 | 10 | 70 | 0 | 5 | 0 |
| 15 | 0.03 | 5 | 30 | 2 | 14 | 0 |
| Com. Ex. 2 | 0 | 0 | 0 | 17 | 55 | 0 |

EXAMPLES 16 TO 21

Flat batteries in accordance with the present invention were produced in the same manner as Example 12, except that the length of the outer circumferential part of the sealing plate was set to 0.20 mm and that the bending height and the bending angle were set as shown in Table 4. these batteries were evaluated in the same manner as Example 1. Results of evaluation are shown in Table 4.

TABLE 4

|  | Bending Height (mm) | Bending Angle (°) | (Gasket thickness/ Bending height) × 100 (%) | Rate of leakage (%) 120 cycle | Rate of leakage (%) 240 cycle | Rate of occurrence of short circuit (%) |
|---|---|---|---|---|---|---|
| Ex. | | | | | | |
| 16 | 0.12 | 30 | 120 | 0 | 0 | 7 |
| 17 | 0.09 | 25 | 90 | 0 | 0 | 0 |
| 18 | 0.07 | 20 | 70 | 0 | 0 | 0 |
| 19 | 0.05 | 15 | 50 | 0 | 0 | 0 |
| 20 | 0.04 | 10 | 40 | 0 | 7 | 0 |
| 21 | 0.02 | 5 | 20 | 6 | 21 | 0 |

EXAMPLES 22 TO 26

Flat batteries in accordance with the present invention were produced in the same manner as Example 12, except that the bending height of the outer circumferential part of the sealing plate was fixed constant to 0.07 mm and that the length of the outer circumferential part and the bending angle were set as shown in Table 5. These batteries were evaluated in the same manner as Example 1. Results of evaluation are shown in Table 5.

TABLE 5

| Length of outer circumferential part (mm) | Bending Angle (°) | (Gasket thickness/ Bending height) × 100 (%) | Rate of leakage (%) | | Rate of occurrence of short circuit (%) |
|---|---|---|---|---|---|
| | | | 120 cycle | 240 cycle | |
| Ex. | | | | | |
| 22  0.60 | 7  | 70 | 5 | 15 | 0 |
| 23  0.40 | 10 | 70 | 0 | 5  | 0 |
| 24  0.30 | 13 | 70 | 0 | 0  | 0 |
| 25  0.20 | 20 | 70 | 0 | 0  | 0 |
| 26  0.10 | 35 | 70 | 0 | 0  | 0 |

The results of Tables 1 to 5 give the following conclusions:

In the flat batteries in accordance with the present invention where the value of the (thickness of the gasket/the bending height)×100(%) is not greater than 95, no short circuit occurs after sealing of the battery.

Since the batteries that are free from leakage after 120 cycles in the thermal impact test for evaluation of leakage may be used for 3 to 5 years in the normal working state and the batteries that are free from leakage after 240 cycles may be used for 5 to 10 years in the normal working state, the flat batteries in accordance with the present invention accordingly have long life.

Especially when the bending angle of the outer circumferential part of the sealing plate is not less than 10 degrees, the batteries tend to be free from leakage after 120 cycles, and the batteries having the greater bending angle with the same length of the outer circumferential part tend to have better leakage resistance.

II. Second Embodiment

The second embodiment of the present invention is characterized in that the case has the turned edge which fit the peripheral section of the sealing plate via the gasket and the turned edge partly presses the gasket.

AS the concrete applications of the second embodiment, there are a Embodiment 2-1 that the turned edge has a circular recess for partly pressing the gasket and another Embodiment 2-2 that the turned edge is inclined to the bottom face of the case to partly press the gasket.

(1) Embodiment 2-1

The flat battery of the Embodiment 2-1 in accordance with the present invention is constituted by sealing a power generation element with: a battery case that works as one electrode terminal; a sealing plate that works as the other electrode terminal and has a flat central section projected outward and a flat peripheral section extending substantially parallel to the flat central section; and a gasket that insulates the case from the sealing plate, and characterized in that the case has a turned edge which fit the peripheral section of the sealing plate via the gasket and has a circular recess for partly pressing the gasket therein.

This means that the case with the circular recess naturally has a circular convex at the side opposite to the circular recess and this circular convex partly presses the gasket.

In this case, the turned edge may have an outer circumferential end bent toward the gasket and the bent outer circumferential end may partly press the gasket.

In the flat battery of the Embodiment 2-1 in accordance with the present invention, the degree of pressing the partly pressed part of the gasket relative to the thickness of the gasket in the non-pressed state, that is, the pressing rate of the partly pressed part of the gasket, may be varied depending upon the material of the gasket.

For example, when the gasket is composed of polyphenylene sulfide, the preferable pressing rate ranges from 10% to 50%. When the gasket is composed of polypropylene, the preferable pressing rate ranges from 30% to 80%. When the gasket is composed of polyethylene terephthalate, the preferable pressing rate ranges from 10% to 70%. When the gasket is composed of polyethylene naphthalate, the preferable pressing rate ranges from 10% to 70%.

When the local pressing rate of any of these gaskets is less than the corresponding lower limit, the leakage resistance may not be improved due to the insufficient pressing rate, and when the local pressing rate exceeds the upper limit, destructions such as cracks and breaks may occur in the gasket due to the excessive pressing rate to cause insufficient insulation of the battery case from the sealing plate and to cause a short circuit in the battery.

The other constituents are identical with those of Embodiment 1 discussed above.

On the other hand, the present invention also provides a method of manufacturing the flat battery in accordance with the Embodiment 2-1. More specifically the present invention is directed to a method of manufacturing a flat battery, wherein a gasket of a substantially L-shaped cross section and a sealing plate that has a flat central section projected outward and a flat peripheral section extending substantially parallel to the flat central section are placed inside a top-open battery case, and a periphery of the case and the peripheral section of the sealing plate are fastened to each other via the gasket, the method comprising the steps of: curving an open end of the case inward to make the periphery of the case U-shaped and thereby form a turned edge; and recessing at least a portion of the turned edge or bending an outer circumferential part of the peripheral section toward the gasket, so as to form a part at which the sealing plate partly presses the gasket.

The Embodiment 2-1 in accordance with the present invention is discussed below in detail with referring to drawings, although the present invention is not restrictive in any sense.

FIG. 3 is a sectional view schematically illustrating a flat battery according to the Embodiment 2-1 of the present invention. In FIG. 3, a case 2 working as a positive electrode terminal was composed of stainless steel having good corrosion resistance. A sealing agent mainly composed of asphalt was applied on the inner surface of the case 2 to form a coating film, although it is not illustrated. A sealing plate 1 formed to a hat shape was also made of stainless steel, like the case 2. The sealing plate 1 had a flat central section 1a protruded outward and a flat peripheral section 1b extending substantially parallel to the central section 1a.

A gasket 3 composed of polyphenylene sulfide and having a substantially L-shaped cross section was placed on the inner surface of the top-open case 2. In the process of bending the gasket 3 inward with the open end of the case 2, the peripheral section 1b of the sealing plate 1 was interposed between the bent gasket 3 to attain insulation of the case 2 from the sealing plate 1 and sealing of the case. At this time, a turned edge 2a was formed on the case 2. Further, a circular recess 2b was formed on the turned edge 2a in the course of caulking.

A positive electrode 5 was provided by mixing manganese dioxide, carbon as an electrically conductive agent, and fluororesin powder as a binding agent, press molding them to pellets of 15 mm in diameter and 0.3 mm in thickness, and drying the pellets at 200° C. for 12 hours.

A negative electrode 6 of a circular shape was punched out of a metal lithium in the form of hoop and bonded to the inner surface of the convex of the sealing plate 1 with pressure. A separator 4 was composed of a polypropylene non-woven fabric and an electrolytic solution was obtained by dissolving lithium perchlorate at a concentration of 1 mol/liter in an equal-volume solvent mixture of propylene carbonate and 1,2-dimethoxyethane.

Figure 14:
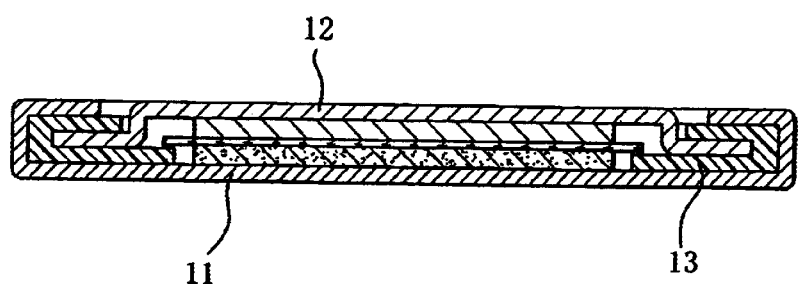
FIG. 14 is a sectional view schematically illustrating the structure of another prior art flat battery.

The flat battery shown in FIG. 3 was manufactured according to the following procedure. In first, the gasket 3 of the substantially L-shaped cross section and the sealing plate 1 having the central section 1a protruded outward and the flat peripheral section 1b were placed in the top-open case 2. At this time, the power generation element having the positive electrode 5 and the negative electrode 6 disposed opposite to each other via the separator 4 was contained in a space defined by the central section 1a of the sealing plate 1 and the case 2. The open end of the case 2 in the state of having the respective constituents contained therein was deformed inward to be U shape along the outer circumference end of the sealing plate via the gasket. Thus, the turned edge fitting the peripheral section of the sealing plate was formed in the case 2 to give the flat battery having a similar cross section to that of the prior art flat battery shown in FIG. 14. At this time, a mold having the cross section shown in FIG. 4 was used to curve the open end of the case 2 inward and attain caulking. FIG. 4 is a sectional view schematically illustrating the structure of the mold used for manufacturing the flat battery according to the Embodiment 2-1 in accordance with the present invention.

Then, for the flat battery having the turned edged 2a formed, the turned edge 2a of the flat battery was pressed again and attained second caulking to form a portion partly pressing the gasket. This gave a circular recess in part of the turned edge 2a and/or an outer circumferential end of the turned edge bent toward the gasket. At the circular recess and/or the bent outer circumferential end, the sealing plate 1 partly pressed the gasket.

Figure 7:
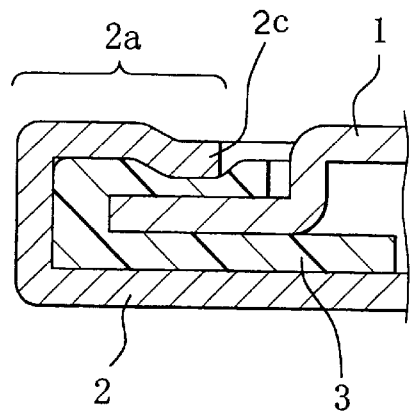
FIG. 7 is a sectional view schematically illustrating a structure of a sealing portion of the flat battery in the second embodiment of the present invention.
Figure 8:
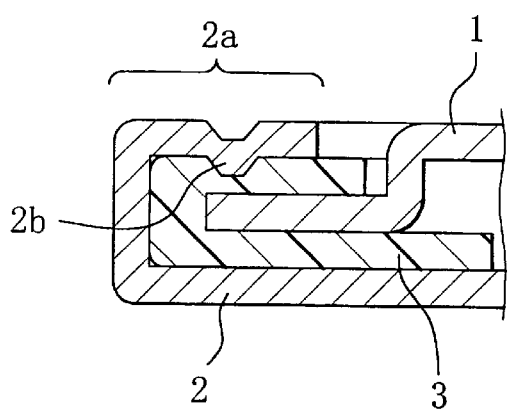
FIG. 8 is a sectional view schematically illustrating a structure of another sealing portion of the flat battery in the second embodiment of the present invention.
Figure 9:
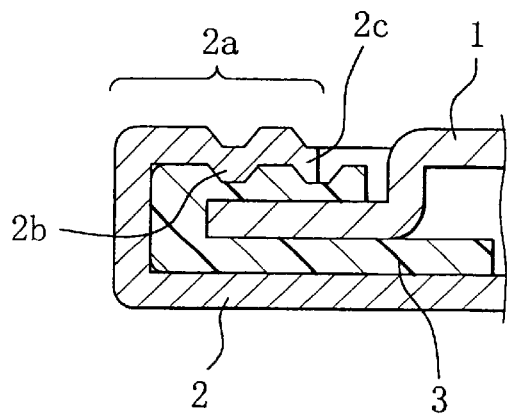
FIG. 9 is a sectional view schematically illustrating a structure of still another sealing portion of the flat battery in the second embodiment of the present invention.

The molds used for such second caulking had cross sections shown in FIGS. 5 and 6. The mold shown in FIG. 5 was used to bend the outer circumferential end toward the gasket. The mold shown in FIG. 6 was used to form the circular recess. The structures of the caulked portions of the flat batteries by using these molds were shown in FIGS. 7 through 9 show. It is noted that, in the flat battery of FIG. 3, a circular recess 2b was formed on the turned edge 2a of the case 2.

Flat batteries were produced with the molds shown in FIGS. 4 to 6 as Examples according to the Embodiment 2-1 in accordance with the present invention, and the properties of the flat batteries were evaluated.

EXAMPLES 27 TO 31 AND COMPARATIVE EXAMPLES 3 TO 5

The power generation element including the positive electrode 5, the negative electrode 6, and the separator 4 as shown in FIG. 3 and the sealing plate 1 were placed in the top-open case 2. The gasket 3 used here was composed of polyphenylene sulfide and had the substantially L-shaped cross section.

After sealing with the mold shown in FIG. 4, the second caulking was performed with the second mold shown in FIG. 5. The second caulking bent the outer circumferential end of the case 2 toward the gasket to form a bent outer circumferential end 2c. As clearly seen in the sectional view of FIG. 7, the bent outer circumferential end 2c partly pressed the gasket in the caulked portion.

The pressing rate of the partly pressed part of the gasket was calculated by measuring the thickness of the gasket in the pressed state from photographs of the cross sections of the respective batteries manufactured, measuring the thickness of the gasket in the non-pressed state, and using an equation of:

(Pressing rate of gasket) (%)=((Gasket thickness in non-pressed state)−(Gasket thickness in pressed state))/(Gasket thickness in non-pressed state)×100.

The pressure applied to the mold was regulated in the second caulking process to vary the degree of bending the outer circumferential end toward the gasket and thereby adjust the pressing rate. A flat battery manufactured with the pressing rate of the pressed part of the gasket (hereinafter simply referred to as the 'pressing rate ') set to 10% was named Battery A.

In the same manner, a flat battery manufactured by using the mold shown in FIG. 5 for the second caulking and having the pressing rate of the gasket set to 30% and the same structure as that of the battery A was named Battery B.

Further, a flat battery manufactured by using the mold shown in FIG. 5 for the second caulking and having the pressing rate of the gasket set to 50% and the same structure as those of the Batteries A and B was named Battery C.

A battery having the circular recess 2b formed on part of the turned edge 2a of the case 2 was manufactured with the mold shown in FIG. 6. As clearly seen in the sectional view of FIG. 8, the caulked portion of the obtained battery has the structure wherein the recess pressed the gasket. A flat battery manufactured having the pressing rate of the gasket set to 30% and otherwise a similar structure to that of the battery A was named Battery D.

After the second caulking with the mold shown in FIG. 6, still another caulking was performed with the mold shown in FIG. 5. The caulked portion of the resulting battery had the outer circumferential end 2c of the case 2 bent toward the gasket and the circular recess 2b formed on part of the turned edge 2a as shown in FIG. 9. A flat battery manufactured having the pressing rate of the gasket set to 30% at both the contact of the outer circumferential end with the gasket and at the circular recess and otherwise a similar structure to that of the battery A was named Battery E.

On the other hand, a flat battery manufactured as a comparative example had a similar structure to that of the battery A, except that the second caulking was not performed and only the turned edge 2a was formed. The cross section of the battery of the comparative example was the same as that of the prior art flat battery shown in FIG. 14. The gasket did not have any specifically pressed part, but was pressed at the rate of 10% against the thickness in the non-pressing state. Obtained here was named Battery F.

Another flat battery was manufactured by bending the outer circumferential end of the battery case toward the gasket at a pressing rate of 5%, and otherwise had a similar structure to that of the battery A. Obtained here was named Battery G. Still another flat battery was manufactured at a pressing rate of 55%, and otherwise had a similar structure to that of the battery A. Obtained here was named Battery H.

All Batteries A through H obtained, which were the flat batteries, had the diameter of 20 mm and the thickness of 0.5 mm. Table 6 shows the pressing rate, the shape of the second mold used, and the structure of the caulked portion with regard to the respective batteries.

TABLE 6

|  | Example (Battery) | | | | | Com. Ex. (Battery) | | |
| --- | --- | --- | --- | --- | --- | --- | --- | --- |
|  | A | B | C | D | E | F | G | H |
| Material of gasket | Polyphenylene sulfide | | | | | Polyphenylene sulfide | | |
| Pressing rate (%) | 10 | 30 | 50 | 30 | 30 | None | 5 | 55 |
| Shape of second mold | FIG. 5 | | FIG. 6 | FIGS. 5 and 6 | FIG. 5 | Not used | | FIG. 5 |
| Cross section of caulked portion | FIG. 7 | | FIG. 8 | FIG. 9 | | FIG. 14 | | FIG. 8 |

A thousand of each of the batteries A through H were manufactured and subjected to evaluation of properties and for the occurrence of leakage. Evaluated properties were the open circuit voltage immediately after assembly of the batteries, the internal resistance under the condition of the alternating current of 1 kHz, and the rate of occurrence of internal short circuit. The open circuit voltage immediately after assembly of the batteries and the internal resistance under the condition of the alternating current of 1 kHz were based on the measurement of 100 batteries each. The rate of occurrence of internal short circuit was obtained by checking all the batteries manufactured.

The batteries were kept at the environmental temperature of 60° C. and the environmental humidity of 90%, that is, under the high hot and humid condition and the state of leakage was visually observed after 20 days.

The batteries were also subjected to a thermal impact test for evaluation of leakage, which repeated a 4 hour cycle that kept the battery at a temperature of −10° C. for 1 hour, heated the battery to 60° C. over 1 hour, kept the battery at the temperature of 60° C. for 1 hour, and cooled down the battery to −10° C. over 1 hour. The state of leakage was visually observed after 100 cycles. Results of evaluation are shown in Table 7.

significant difference of such properties was observed according to the presence of the specifically pressed part of the gasket or its degree of pressing.

The occurrence of leakage was, however, observed in both the evaluation tests of leakage with regard to Battery G having the low pressing rate and Battery F having no specifically pressed part, which may be ascribed to the insufficient pressing rate of the gasket. With regard to Battery H having the high pressing rate, on the other hand, the internal short circuit occurred after assembly of the battery, which was ascribed to the excessive pressing rate of the gasket, which resulted in cracking and breaking the gasket to bring the sealing plate into contact with the inner side face of the case.

EXAMPLES 32 TO 34

Flat batteries were manufactured with the molds of FIGS. 4 through 6 in the same manner as Example 27, except that materials other than polyphenylene sulfide were used for the gasket and the properties of these batteries were evaluated.

The same power generation element and casing as those of Example 27 were used and the power generation element including the positive electrode 5, the negative electrode 6, and the separator 4 as shown in FIG. 3 and the sealing plate 1 were placed in the top-open case 2. The gasket 3 used here was composed of polypropylene and had the substantially L-shaped cross section.

Like Battery A of Example 27, after sealing with the mold shown in FIG. 4, the caulking was performed with the mold shown in FIG. 5. At this time, the pressing rate of the gasket was set to 60%. Obtained here was called Battery I.

Battery J was manufactured with a gasket of polyethylene terephthalate and at the pressing rate of the gasket set to 60%, and otherwise had the same structure as that of Battery A.

Battery K was manufactured with a gasket of polyethylene naphthalate and at the pressing rate of the gasket set to 60%, and otherwise had the same structure as that of the battery A.

All Batteries I through K obtained, which were flat batteries, had the diameter of 20 mm and the thickness of 0.5

TABLE 7

| | | Example (Battery) | | | | | Com. Ex. (Battery) | | |
| --- | --- | --- | --- | --- | --- | --- | --- | --- | --- |
| | | A | B | C | D | E | F | G | H |
| Open circuit voltage | Mean (V) | 3.302 | 3.310 | 3.312 | 3.313 | 3.316 | 3.320 | 3.320 | 3.318 |
| | Standard deviation | 0.001 | 0.001 | 0.002 | 0.002 | 0.001 | 0.001 | 0.001 | 0.001 |
| Internal resistance | Mean (V) | 12.3 | 12.5 | 12.1 | 11.8 | 11.6 | 12.3 | 12.4 | 11.7 |
| | Standard deviation | 1.0 | 0.9 | 1.3 | 1.2 | 1.0 | 1.0 | 1.0 | 0.8 |
| Thermal impact test | State of leakage | No leak | No leak | No leak | No leak | No leak | 3 leaked | 2 leaked | No leak |
| Storage in hot, humid condition | State of leakage | No leak | No leak | No leak | No leak | No leak | 5 leaked | 3 leaked | No leak |
| Internal short circuit | Occurrence rate (%) | 0 | 0 | 0 | 0 | 0 | 0 | 0 | 12 |

Results of Table 7 show that all the batteries of Examples 27 to 31 and Comparative Examples 3 to 5 have the stable voltage and internal resistance with little variation and no mm. Table 8 shows the material of the gasket, the pressing rate, the shape of the second mold used, and the structure of the caulked portion with regard to the respective batteries.

TABLE 8

|  | Example | | |
|---|---|---|---|
|  | Battery I | Battery J | Battery K |
| Material of gasket | Polypropylene | Polyethylene terephthalate | Polyethylene naphthalate |
| Pressing rate (%) |  | 60 |  |
| Shape of second mold |  | FIG. 5 |  |
| Cross section of caulked portion |  | FIG. 7 |  |

Then, a thousand of each of the batteries were manufactured and subjected to evaluation of properties and for the occurrence of leakage in the same manner as Example 27. Results of evaluation are shown in Table 9.

TABLE 9

|  |  | Example (Battery) | | |
|---|---|---|---|---|
|  |  | I | J | K |
| Open circuit voltage | Mean (V) | 3.321 | 3.320 | 3.319 |
|  | Standard deviation | 0.0015 | 0.0013 | 0.002 |
| Internal resistance | Mean(V) | 12.4 | 12.3 | 11.9 |
|  | Standard deviation | 1.0 | 1.0 | 1.1 |
| Thermal impact test | State of leakage | No leak | 2 leaked | No leak |
| Storage in hot, humid condition | State of leakage | No leak | 3 leaked | No leak |
| Internal short circuit | Occurrence rate (%) | 0 | 0 | 0 |

As apparent from results of Table 9, all Batteries I to K have the stable voltage and internal resistance with little variation and no significant difference of such properties was observed according to the presence of the specifically pressed part of the gasket or the degree of pressing. No leakage was observed in either of the leakage evaluation tests. As in the case of Example 27, these results prove that formation of the recess on part of the turned edge and/or formation of the bent outer circumferential end to partly press the gasket give the flat batteries that are substantially free from the occurrence of leakage or internal short circuit, without deteriorating the properties of the batteries.

Under the condition of the insufficient pressing rate of the gasket, the occurrence of leakage was observed with regard to the batteries having the gaskets composed of the materials in Examples 32 to 34. The respective materials of the gasket had the intrinsic minimum limits of the pressing rate of the gasket.

In order to obtain the batteries of high reliability, the pressing rate of the gasket by the recess formed along the whole circumference of the turned edge should be not less than the minimum limit specified for each material of the gasket.

Further, in the case of the excessive pressing rate of the gasket, there is observed a short circuit between the sealing plate and the inner side face of the case due to the destruction of the gasket. Such failures are generally checked by the inspection in the manufacturing process and may not be found in the market, but in order to enhance the reliability of the batteries, the local pressing rate of the gasket by the recess formed along the whole circumference of the turned edge should be not greater than the maximum limit specified for each material of the gasket.

In the above examples, the recess was formed by caulking the turned edge of the case. Another applicable procedure may form a recess in the case and then carry out caulking.

(2) Embodiment 2-2

The flat battery of Embodiment 2-2 in accordance with the present invention is constituted by sealing a power generation element with: a battery case that works as one electrode terminal; a sealing plate that works as the other electrode terminal and has a flat central section projected outward and a flat peripheral section extending substantially parallel to the flat central section; and a gasket that insulates the case from the sealing plate, characterized in that the turned edge is inclined to the bottom face of the case to partly press the gasket.

In the flat battery of Embodiment 2-2, the degree of pressing a part of the gasket relative to the thickness of the gasket in the non-pressed state, that is, the pressing rate of the pressed part of the gasket, depends upon the material of the gasket.

As in Embodiment 2-1 discussed above, for example, when the gasket is composed of polyphenylene sulfide, the preferable pressing rate ranges from 10% to 50%. When the gasket is composed of polypropylene, the preferable pressing rate ranges from 30% to 80%. When the gasket is composed of polyethylene terephthalate, the preferable pressing rate ranges from 10% to 70%, and when the gasket is composed of polyethylene naphthalate, the preferable pressing rate ranges from 10% to 70%.

The flat battery of Embodiment 2-2 is obtained by otherwise using the same constituents as those of Embodiment 1 and Embodiment 2-1.

Therefore, the present invention also relates to a method of manufacturing the flat battery according to Embodiment 2-2. More specifically the present invention is directed to a method of manufacturing a flat battery, wherein a gasket of a substantially L-shaped cross section and a sealing plate that has a flat central section projected outward and a flat peripheral section extending substantially parallel to the flat central section are placed inside a top-open battery case, and a periphery of the case and the peripheral section of the sealing plate are fastened to each other via the gasket, the method comprising the steps of: curving an open end of the case inward to make the periphery of the case U-shaped and thereby form a turned edge that is substantially parallel to a bottom face of the case; and inclining the turned edge to the bottom face of the case, so as to partly press the gasket.

In this case, it is preferable that angle of the inclination of the turned edge is in a range of 5 to 20 degrees relative to a direction parallel to the bottom face of the case.

The Embodiment 2-2 in accordance with the present invention is discussed below in detail with referring to drawings, although the discussion is not restrictive in any sense.

Figure 10:
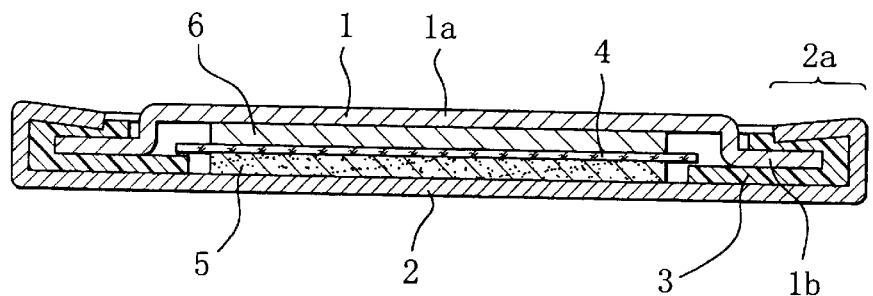
FIG. 10 is a sectional view schematically illustrating the structure of another flat battery according to the second embodiment of the present invention.

FIG. 10 is a sectional view schematically illustrating a flat battery according to Embodiment 2-2 of the present invention. In FIG. 10, a case 2 working as a positive electrode terminal was composed of stainless steel having good corrosion resistance. A sealing agent mainly composed of asphalt was applied on the inner surface of the case 2 to form a coat, although it is not illustrated. A sealing plate 1 formed to a hat shape was also made of stainless steel like the case 2 and worked as a negative electrode terminal. The sealing plate 1 had a flat central section 1a protruded outward and a flat peripheral section 1b extending substantially parallel to the central section 1a.

A gasket 3 composed of polyphenylene sulfide and having a substantially L-shaped cross section was placed on the inner surface of the top-open case 2. In the process of bending the open end of the case 2 inward, the peripheral section 1b of the sealing plate 1 was interposed between the bent gasket 3 to attain insulation of the case 2 from the sealing plate 1 and sealing of the case. At this time, a turned edge 2a was formed on the case 2. Further, in the course of caulking, the end of the turned edge 2a was inclined to the gasket 3, so as to form a specific part that pressed the gasket 3.

A positive electrode 5 was provided by mixing manganese dioxide, carbon as an electrically conductive agent, and fluororesin powder as a binding agent, press forming the mixture to pellets of 15 mm in diameter and 0.3 mm in thickness, and drying the pellets at 200° C. for 12 hours. A negative electrode 6 of a circular shape was punched out of a metal lithium in the form of hoop and bonded to the inner surface of the convex of the sealing plate 1 with pressure.

A separator 4 was composed of a polypropylene non-woven fabric. An electrolytic solution was obtained by dissolving lithium perchlorate at a concentration of 1 mol/liter in an equal-volume solvent mixture of propylene carbonate and 1,2-dimethoxyethane.

The battery shown in FIG. 10 was manufactured according to the following procedure.

In first, the gasket 3 of the substantially L-shaped cross section and the sealing plate 1 having the central section 1a protruded outward and the flat peripheral section 1b were placed in the top-open case 2. At this time, the power generation element having the positive electrode 5 and the negative electrode 6 opposed to each other via the separator 4 was contained in a space defined by the central section 1a of the sealing plate 1 and the case 2. The open end of the case 2 in the state of having the respective constituents contained therein was deformed inward and turned along the outer circumference end of the sealing plate via the gasket 3. Namely, the outer circumference end of the case 2 was to be in the U shape. Thereby, the turned edge 2a fitting the peripheral section of the sealing plate fitted therein was accordingly formed in the case 2 to give the flat battery having a similar cross section to that of the prior art flat battery shown in FIG. 14. At this time, a mold having the cross section shown in FIG. 4 was used to deform the open end of the case 2 inward and attain caulking.

For the flat battery with the turned edge 2a formed, the turned edge 2a of the flat battery was pressed again to attain second caulking to form a portion partly pressing the gasket. Thereby, the end of the turned edge 2a was then further bent toward the gasket, so that the gasket 3 was partly pressed by the peripheral section 1b of the sealing plate 1 and the turned edge 2a of the case 2.

Figure 11:
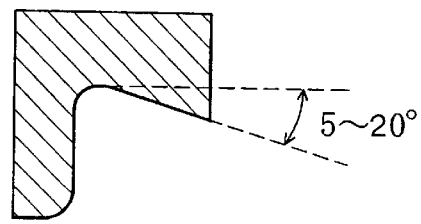
FIG. 11 is a sectional view schematically illustrating the structure of a mold used for manufacturing the another flat battery in the second embodiment of the present invention.
Figure 12:
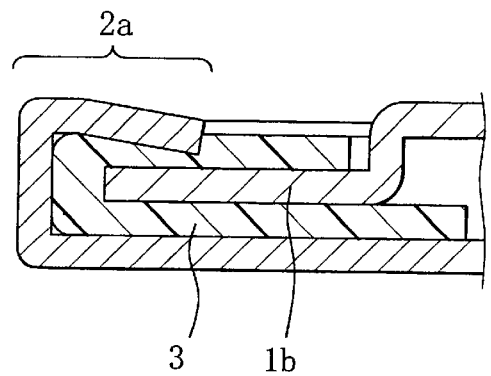
FIG. 12 is a sectional view schematically illustrating a structure of still another sealing portion of the another flat battery in the second embodiment of the present invention.
Figure 13:
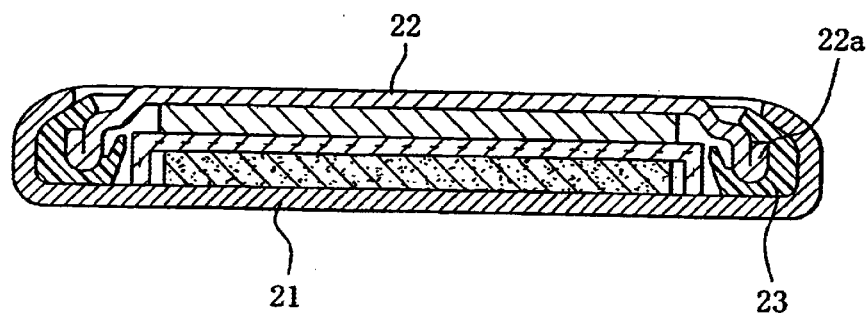
FIG. 13 is a sectional view schematically illustrating the structure of a prior art coin type battery.

The mold used for the second caulking had a cross section shown in FIG. 11. It is preferable that the caulking section of the mold shown in FIG. 11 has the angle of inclination in a range of 5 to 20 degrees relative to the horizontal plane. A sectional view schematically illustrating the caulked portion of the flat battery with this mold is shown in FIG. 12.

Flat batteries were produced with the molds shown in FIGS. 4 and 11 as Examples of Embodiment 2-2 in accordance with the present invention, and the properties of the flat batteries were evaluated.

EXAMPLES 35 TO 38 AND COMPARATIVE EXAMPLE 6 TO 10

The power generation element including the positive electrode 5, the negative electrode 6, and the separator 4 as shown in FIG. 10 and the sealing plate 1 were placed in the top-open case 2. The gasket 3 used here was composed of polyphenylene sulfide and had the substantially L-shaped cross section.

After caulking and sealing with the mold shown in FIG. 4, the second caulking was performed with the second mold shown in FIG. 11. The second mold had the angle of inclination set to 5 degrees relative to the horizontal plane. The second caulking further bent the turned edge 2a of the case 2 toward the gasket 3 to form an inclination. As clearly seen in the sectional view of FIG. 12, the inclined turned edge 2a partly pressed the gasket in the caulked portion.

The pressing rate of the gasket in the partly pressed part was calculated by measuring the thickness of the gasket from photographs of the cross sections of the respective batteries manufactured, measuring the thickness of the gasket in the non-pressed state, and using an equation of:

(Pressing rate of gasket) (%)=((Gasket thickness in non-pressed state)−(Gasket thickness in pressed state))/(Gasket thickness in non-pressed state)×100.

The pressure applied to the mold was regulated in the second caulking process to vary the angle of inclination of the turned edge 2a to the gasket 3 and thereby adjust the pressing rate. A flat battery manufactured here having the pressing rate of the partly pressed part of the gasket 3 set to 10% was named Battery L.

In the same manner, one manufactured with the mold shown in FIG. 11 for the second caulking, and otherwise having the same structure as that of the battery A with the pressing rate of the gasket set to 30% was named Battery M.

Further, one manufactured with the mold shown in FIG. 11 for the second caulking, and otherwise having the same structure as that of the battery A with the pressing rate of the gasket set to 50% was named Battery N.

One manufactured with the mold of FIG. 11 for second caulking, which had the angle of inclination set to 20 degrees relative to the horizontal plane, and otherwise having the same structure as that of the battery A with the pressing rate of the gasket set to 30% was named Battery O.

On the other hand, a battery was manufactured as a comparative example, which had a similar structure to that of the battery A, except that the second caulking was not performed and only the turned edge 2a was formed. The cross section of the battery manufactured here was the same as that of the prior art flat battery shown in FIG. 14. At this time, the gasket did not have any specifically pressed part, but was pressed at the rate of 10% against the thickness in the non-pressed state. Obtained here was named Battery P.

Battery Q was manufactured with the mold of FIG. 11 for second caulking, which had the angle of inclination set equal to 5 degrees relative to the horizontal plane, and otherwise had a similar structure to that of the battery A with the pressing rate of the gasket set to 5%. Still another Battery R was manufactured with the mold of FIG. 11 for second caulking, which had the angle of inclination set equal to 5 degrees relative to the horizontal plane, and otherwise had a similar structure to that of the battery A with the pressing rate of the gasket set to 55%.

As a further comparative example, another Battery S was manufactured with the mold of FIG. 11 for second caulking, which had the angle of inclination set equal to 3 degrees relative to the horizontal plane, and otherwise had a similar structure to that of the battery A. Still another Battery T was manufactured with the mold of FIG. 11 for second caulking, which had the angle of inclination set equal to 30 degrees relative to the horizontal plane, and otherwise had a similar structure to that of the battery A.

All the flat batteries L through T thus obtained had the diameter of 20 mm and the thickness of 0.5 mm. Table 10 shows the pressing rate, the angle of inclination of the mold shown in FIG. 11, and the structure of the caulked portion with regard to the respective batteries.

TABLE 10

|  | Example (Battery) |  |  | Com. Ex. (Battery) |  |  |  |  |
| --- | --- | --- | --- | --- | --- | --- | --- | --- |
|  | L | M | N | O | P | Q | R | S | T |
| Material of gasket | Polyphenylenesulfide |  |  |  |  |  |  |  |
| Pressing rate (%) | 10 | 30 | 50 | 30 | None | 5 | 55 | — | — |
| Angle of inclination of second mold |  | 5 |  | 20 | Not conducted | 5 | 3 |  | 30 |
| Cross section of caulked portion |  | FIG. 12 |  |  | FIG. 14 | FIG. 12 | FIG. 14 | FIG. 12 |  |

Then, a thousand of each of the batteries were manufactured and subjected to evaluation of battery properties and for the occurrence of leakage. Evaluated properties were the open circuit voltage immediately after assembly of the batteries, the internal resistance under the condition of the alternating current of 1 kHz, and the rate of occurrence of internal short circuit. The open circuit voltage immediately after assembly of the batteries and the internal resistance under the condition of the alternating current of 1 kHz were based on the measurement of 100 batteries each and the rate of occurrence of internal short circuit was the results of checking all the batteries manufactured.

The batteries were kept at the environmental temperature of 60° C. and the environmental humidity of 90%, that is, under the hot, humid condition, and the state of leakage was visually observed after 20 days. The batteries were also subjected to a thermal shock test for evaluation of leakage, which repeated a 4-hour cycle that kept the battery at a temperature of −10° C. for 1 hour, heated the battery to 60° C. over 1 hour, kept the battery at the temperature of 60° C. for 1 hour, and cooled down the battery to −10° C. over 1 hour. The state of leakage was visually checked after 100 cycles. Results of evaluation are shown in Table 11.

was, however, observed in both the evaluation tests of leakage with regard to the battery Q having the low pressing rate and the battery P having no specifically pressed part, which may be ascribed to the insufficient pressing rate of the gasket.

With regard to the battery R having the high pressing rate, on the other hand, there was observed that the internal short circuit occurred after assembly of the battery. As a result of investigation, this was ascribed to the excessive pressing rate of the gasket, which resulted in cracking and breaking the gasket to bring the sealing plate into contact with the inner side face of the case.

In the case of Battery S manufactured with the second caulking mold having the small angle of inclination, regulation of the pressure did not sufficiently raise the pressing rate of the gasket and the occurrence of leakage was observed in both the evaluation tests, which may be ascribed to the insufficient pressing rate of the gasket. In the case of the battery T manufactured with the second caulking mold having the large angle of inclination, on the other hand, regulation of the pressure did not sufficiently lower the pressing rate of the gasket. The internal short circuit occurred after assembly of the battery. As a result of investigation, this was ascribed to the excessive pressing rate of the gasket, which resulted in cracking and breaking the gasket to bring the sealing plate into contact with the inner side face of the case.

EXAMPLES 39 TO 41

Flat batteries were manufactured with the molds of FIGS. 4 and 11 in the same manner as Example 35, except that materials other than polyphenylene sulfide were used for the gasket and the properties of these batteries were evaluated. The mold shown in FIG. 11 had the angle of inclination set to 5 degrees.

The same power generation element and casing as those of Example 35 were used and the power generation element including the positive electrode 5, the negative electrode 6, and the separator 4 as shown in FIG. 10 and the sealing plate 1 were placed in the top-open case 2. The gasket 3 used here was composed of polypropylene and had the substantially L-shaped cross section. Like the battery L of Example 35, after sealing with the mold shown in FIG. 4, the caulking was performed with the second mold shown in FIG. 11. The pressing rate of the gasket was set to 60%. Obtained here was named Battery U.

TABLE 11

|  |  | Example (Battery) |  |  |  | Com. Ex. (Battery) |  |  |  |  |
| --- | --- | --- | --- | --- | --- | --- | --- | --- | --- | --- |
|  |  | L | M | N | O | P | Q | R | S | T |
| Open circuit voltage | Mean (V) | 3.320 | 3.321 | 3.335 | 3.315 | 3.322 | 3.333 | 3.316 | 3.330 | 3.320 |
|  | Standard deviation | 0.001 | 0.002 | 0.001 | 0.002 | 0.001 | 0.001 | 0.002 | 0.002 | 0.002 |
| Internal resistance | Mean (V) | 12.3 | 11.8 | 12.5 | 11.9 | 12.4 | 11.1 | 12.7 | 11.8 | 12.0 |
|  | Standard deviation | 0.9 | 0.8 | 0.8 | 0.9 | 1.0 | 0.9 | 0.8 | 1.0 | 1.0 |
| Thermal impact test |  | No leak | No leak | No leak | No leak | 3 leaked | 2 leaked | No leak | 3 leaked | No leak |
| Storage in hot, humid condition |  | No leak | No leak | No leak | No leak | 2 leaked | 1 leaked | No leak | 3 leaked | No leak |
| Internal short circuit Occurrence rate (%) |  | 0 | 0 | 0 | 0 | 0 | 0 | 7.5 | 0 | 8.3 |

From Table 11, all the Batteries L to T have the stable voltage and internal resistance with little variation and no significant difference of such battery properties was observed according to the presence of the pressed part of the gasket or the degree of pressing. The occurrence of leakage Battery V was manufactured with a gasket of polyethylene terephthalate and at the pressing rate of the gasket set equal to 60%, and otherwise had the same structure as that of the battery L. Battery W was manufactured with a gasket of polyethylene naphthalate and at the pressing rate of the gasket set equal to 60%, and otherwise had the same structure as that of the battery L.

All Batteries U through W obtained, which were the flat batteries, had the diameter of 20 mm and the thickness of 0.5 mm. The material of the gasket, the pressing rate, the angle of inclination of the second mold shown in FIG. 11, and the structure of the caulked portion with regard to the respective batteries were shown in FIG. 12.

TABLE 12

|  | Example | | |
| --- | --- | --- | --- |
|  | Battery U | Battery V | Battery W |
| Material of gasket | Polypropylene | Polyethylene terephthalate | Polyethylene naphthalate |
| Pressing rate (%) | 60 | 60 | 60 |
| Angle of inclination of second mold |  | FIG. 5 |  |
| Cross section of caulked portion |  | FIG. 12 |  |

A thousand of each of the batteries were manufactured and subjected to evaluation of properties and for the occurrence of leakage in the same manner as Example 35 by applying the same manner as in Example 35. Results of evaluation are shown in Table 13.

TABLE 13

|  |  | Example (Battery) | | |
| --- | --- | --- | --- | --- |
|  |  | U | V | W |
| Open circuit voltage | Mean (V) | 3.322 | 3.319 | 3.330 |
|  | Standard deviation | 0.002 | 0.002 | 0.001 |
| Internal resistance | Mean (V) | 11.8 | 11.9 | 12.0 |
|  | Standard deviation | 0.9 | 0.8 | 0.8 |
| Thermal impact test |  | No leak | No leak | No leak |
| Storage in hot, humid condition |  | No leak | No leak | No leak |
| Internal short circuit Occurrence rate (%) |  | 0 | 0 | 0 |

As apparent from Table 13, all Batteries U to W have the stable voltage and internal resistance with little variation and no significant difference of such properties was observed according to the material of the gasket. No leakage was observed in either of the leakage evaluation tests. As in the case of Example 35, these results prove that inclination of the turned edge of the case forms a specific part at the end of the case to partly press the gasket and accordingly gives the flat batteries that are substantially free from the occurrence of leakage or internal short circuit, without deteriorating the properties of the batteries.

Under the condition of the insufficient pressing rate of the gasket, the occurrence of leakage was observed with regard to the batteries having the gaskets composed of the above materials and the respective materials of the gasket had the intrinsic minimum limits of the pressing rate of the gasket. In order to obtain the batteries of high reliability, the pressing rate of the gasket by the inclination along the whole circumference of the turned edge of the case should be not less than the minimum limit specified for each material of the gasket.

The excessive pressing rate of the gasket damaged the gasket and caused a short circuit between the sealing plate and the inner side face of the case. Such failures are generally checked by the inspection in the manufacturing process and may not be found in the market. In order to enhance the reliability of the batteries, however, the pressing rate of the gasket by the inclination along the whole circumference of the turned edge of the case should be not greater than the maximum limit specified for each material of the gasket.

In Embodiment 2-2, use of the mold with the inclination shown in FIG. 11 for the first caulking caused distortion of the battery, which may be ascribed to the excessive bending stress in the bending work. Such caulking at the lowered pressing speed prevents the distortion, but significantly damages the mass productivity. Division of the caulking process into two stages as discussed in the above embodiment gives the batteries of stable shape at the high mass productivity.

Industrial Applicability

The flat battery of the present invention has the peripheral section of the sealing plate and/or the turned edge of the case, which are formed to specific shapes. This arrangement ensures the secure caulking of the sealing plate, the gasket, and the case at the end of the case, thus giving the flat battery that is as thin as of not greater than 1 mm and has excellent leakage resistance and mass productivity.

What is claimed is:

1. A flat battery having a sealed power generation element comprising: a battery case that works as one electrode terminal; a sealing plate that works as a second electrode terminal and has a flat central section projecting outwardly and a flat peripheral section extending substantially parallel to the flat central section; and a gasket in a form of a film that insulates said case from said sealing plate, wherein an outer circumferential part of said peripheral section of said sealing plate is bent toward said flat central section, a bending angle of said outer circumferential part is in a range of 5 to 45 degrees relative to a horizontal plane, said gasket is composed of polyphenylene sulfide, a partly pressed part of said gasket is pressed at a rate of 10 to 50% of an original thickness of said gasket in a non-pressed state, and a thickness of said flat battery is not greater than 1.0 mm.

2. The flat battery in accordance with claim 1, wherein said outer circumferential part of said sealing plate is located in said case and the height of said outer circumferential part is not greater than 95% of thickness of the gasket.

3. The flat battery in accordance with claim 1, wherein the thickness of said sealing plate is not greater than 0.2 mm.

4. A flat battery having a sealed power generation element comprising: a battery case that works as one electrode terminal; a sealing plate that works as a second electrode terminal and has a flat central section projecting outwardly and a flat peripheral section extending substantially parallel to the flat central section; and a gasket in a form of a film that insulates said case from said sealing plate, wherein an outer circumferential part of said peripheral section of said sealing plate is bent toward said flat central section, a bending angle of said outer circumferential part is in a range of 5 to 45 degrees relative to a horizontal plane, said gasket is composed of polypropylene, a partly pressed part of said gasket is pressed at a rate of 30 to 80% of an original thickness of said gasket in a non-pressed state, and a thickness of said flat battery is not greater than 1.0 mm.

5. A flat battery having a sealed power generation element comprising: a battery case that works as one electrode terminal; a sealing plate that works as a second electrode terminal and has a flat central section projecting outwardly and a flat peripheral section extending substantially parallel to the flat central section; and a gasket in a form of a film that insulates said case from said sealing plane, wherein an outer circumferential part of said peripheral section of said sealing plate is bent toward said flat central section, a bending angle of said outer circumferential part is in a range of 5 to 45 degrees relative to a horizontal plane, said gasket is composed of polyethylene terephthalate, a partly pressed part of said gasket is pressed at a rate of 10 to 70% of an original thickness of said gasket in a non-pressed state, and a thickness of said flat battery is not greater than 1.0 mm.

6. A flat battery having a sealed power generation element comprising: a battery case that works as one electrode terminal; a sealing plate that works as a second electrode terminal and has a flat central section projecting outwardly and a flat peripheral section extending substantially parallel to the flat central section; and a gasket in a form of a film that insulates said case from said sealing plate, wherein an outer circumferential part of said peripheral section of said sealing plate is bent toward said flat central section, a bending angle of said outer circumferential part is in a range of 5 to 45 degrees relative to a horizontal plane, said gasket is composed of polyethylene naphthalate, a partly pressed part of said gasket is pressed at a rate of 10 to 70% of an original thickness of said gasket in a non-pressed state; and a thickness of said flat battery is not greater than 1.0 mm.

\* \* \* \* \*